(12) United States Patent
Philbrick et al.

(10) Patent No.: US 12,265,955 B1
(45) Date of Patent: Apr. 1, 2025

(54) SYSTEMS AND METHODS FOR DISPLAYING INFORMATION ON A PAYMENT CARD

(71) Applicant: United Services Automobile Association (USAA), San Antonio, TX (US)

(72) Inventors: Ashley Raine Philbrick, San Antonio, TX (US); Oscar Guerra, San Antonio, TX (US); Kelly Q. Baker, San Antonio, TX (US); Janelle Denice Dziuk, Falls City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 425 days.

(21) Appl. No.: 17/029,503

(22) Filed: Sep. 23, 2020

Related U.S. Application Data

(60) Provisional application No. 62/908,301, filed on Sep. 30, 2019.

(51) Int. Cl.
| | |
|---|---|
| *G06Q 20/00* | (2012.01) |
| *G06K 19/06* | (2006.01) |
| *G06K 19/07* | (2006.01) |
| *G06Q 20/20* | (2012.01) |
| *G06Q 20/34* | (2012.01) |

(52) U.S. Cl.
CPC ..... *G06Q 20/341* (2013.01); *G06K 19/06187* (2013.01); *G06K 19/0723* (2013.01); *G06Q 20/204* (2013.01); *G06Q 20/352* (2013.01); *G06Q 2220/00* (2013.01)

(58) Field of Classification Search
CPC ... G06Q 20/341; G06Q 20/204; G06Q 20/352
See application file for complete search history.

(56) References Cited

U.S. PATENT DOCUMENTS

| | | | |
|---|---|---|---|
| 7,991,664 B1* | 8/2011 | Stone | G06Q 20/207 |
| | | | 707/999.107 |
| 9,092,766 B1* | 7/2015 | Bedier | G06Q 20/047 |
| 2009/0143104 A1* | 6/2009 | Loh | G06Q 20/352 |
| | | | 340/10.1 |
| 2017/0075701 A1* | 3/2017 | Ricci | G06F 21/31 |
| 2017/0300796 A1* | 10/2017 | Mullen | G06K 19/07705 |
| 2019/0325428 A1* | 10/2019 | Wyatt | G06Q 20/24 |

* cited by examiner

*Primary Examiner* — Rokib Masud
(74) *Attorney, Agent, or Firm* — Fletcher Yoder, P.C.

(57) ABSTRACT

A payment card may include a physical encoder integrated into a card body of the payment card. The physical encoder encodes data unique to the payment card and enables a point-of-sale system to read the data unique to the payment card to facilitate a transaction. The payment card may also include an electronic display integrated into the card body. The payment card may further include a card computing system integrated into the card body and having one or more processors that are configured to receive account information related to an account associated with the data unique to the payment card and to instruct the display to display the account information for visualization by a user of the payment card.

20 Claims, 2 Drawing Sheets

SYSTEMS AND METHODS FOR DISPLAYING INFORMATION ON A PAYMENT CARD

CROSS-REFERENCE TO RELATED APPLICATION

This application claims priority to and the benefit of U.S. Provisional Application No. 62/908,301, entitled "SYSTEMS AND METHODS FOR DISPLAYING INFORMATION ON A PAYMENT CARD," filed Sep. 30, 2019, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Payment cards (e.g., credit cards, prepaid cards, gift cards) have grown in popularity. This is largely because payment cards are a more convenient and efficient payment option than using cash. Some payment cards may include a user's name, an account number, an expiration date, and/or a security code printed onto the payment card to assist the user in completing transactions with the payment card.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a payment card may include a physical encoder integrated into a card body of the payment card. The physical encoder encodes data unique to the payment card and enables a point-of-sale system to read the data unique to the payment card to facilitate a transaction. The payment card may also include an electronic display integrated into the card body. The payment card may further include a card computing system integrated into the card body and having one or more processors that are configured to receive account information related to an account associated with the data unique to the payment card and to instruct the display to display the account information for visualization by a user of the payment card.

In one embodiment, a payment card system may include a payment card having an electronic display. The payment card may include a wireless transceiver configured to receive encrypted data via one or more wireless signals, wherein the encrypted data relates to an account associated with the payment card. The payment card may also include a power harvesting circuit coupled to the wireless transceiver and configured to harvest power using the one or more wireless signals to provide power for the electronic display. The payment card may further include a processing circuit configured to decrypt the encrypted data and provide decrypted data to the electronic display for presentation via the electronic display.

In one embodiment, a method of using a payment card system may include receiving, using one or more processors of a payment card of the payment card system, account information for an account associated with the payment card in response to the payment card being within range of a wireless communication device of the payment card system. The method may also include instructing, using the one or more processors of the payment card, display of the account information for the account associated with the payment card via an electronic display of the payment card in response to receipt of the account information for the account associated with the payment card.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
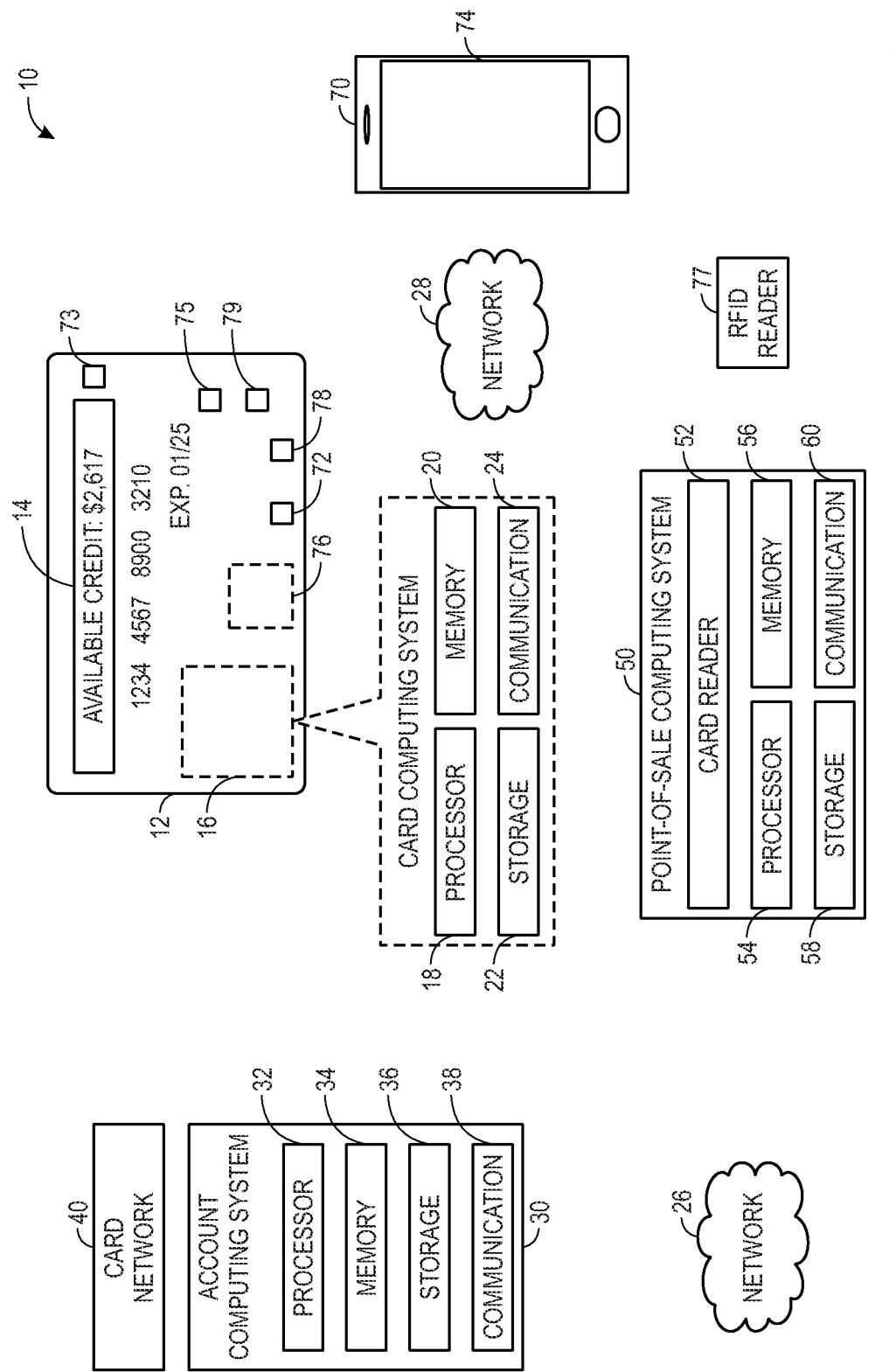
FIG. 1 illustrates a block diagram of a payment card system, wherein account information is displayed on a display of a payment card of the payment card system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terminology used herein is for the purpose of describing particular embodiments only and is not intended to be limiting. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof.

As the general population makes less cash transactions and more digital transactions (e.g., payment card transactions), it becomes increasingly difficult for each user to track an amount of expendable funds (e.g., actual funds, credit) available in their respective accounts (e.g., payment card accounts). That is, because each user may complete numerous in-store transactions, numerous online transactions, and/or schedule automatic electronic payment of bills to be withdrawn at various times, each user may not be aware of what they are able to spend without exceeding an amount (e.g., available amount; available credit) or while maintaining enough funds to pay future bills. Furthermore, there may be multiple users for a single account (e.g., authorized users of the payment card account associated with the payment card), which may make it more difficult for each user to be aware of what they are able to spend.

With the foregoing in mind, certain embodiments of the present disclosure include a payment card system that may include a payment card with a display (e.g., electronic display; low-power electronic display, such as an electronic ink display) that may be updated over time to display account information (e.g., visual alerts of account information) for visualization by a user. For example, if the payment card is a credit card type of payment card, an amount of available credit in a credit account associated with the credit card may be displayed on the credit card. While the examples provided in the present disclosure generally relate to a credit card type of payment card to facilitate discussion, it should be appreciated that features of the present disclosure may be adapted for use with other types of payment cards, such as a debit card type of payment card and/or a gift card type of payment card. For example, if the payment card is a debit card type of payment card, an amount of actual funds in a bank account associated with the debit card may be displayed on the debit card. Similarly, if the payment card is a gift card type of payment card, an amount of a remaining balance associated with the gift card may be displayed on the gift card. In this way, the disclosed embodiments may provide an indication of what the user is able to spend using the payment card on the payment card itself via the display and/or other types of account information related to the payment card on the payment card itself via the display. Advantageously, in some embodiments, the user does not access or view another device (e.g., a user device, such as mobile device; a merchant device, such as a point-of-sale device of a point-of-sale computing system) that is separate from the payment card to view the account information, but instead may view the account information directly on the payment card that is being used to complete transactions for the account (e.g., by swiping the payment card at the point-of-sale computing system). Thus, the user may be efficiently notified or alerted with time sensitive information (e.g., the amount of available credit) on the payment card itself (e.g., upon entering a store or approaching the point-of-sale computing system) even when the user device (e.g., mobile device) is offline.

The payment card may receive the account information, which is unique to and updated for the payment card, from a remote data source. As discussed in more detail below, the payment card may communicate with an account computing system, the point-of-sale computing system, and/or a user device (e.g., mobile device) to obtain the account information. In some such embodiments, the payment card may include a processor that receives the account information and instructs display of the account information via the display on the payment card. It should be appreciated that the payment card may be designed to have minimal processing capabilities and/or power usage, which may enable the payment card to be small in size and easily held by the user of the payment card. For example, the payment card may include a radio-frequency identification (RFID) tag that receives encrypted data indicative of the account information (e.g., that provides the account information when decrypted). The RFID tag may receive the encrypted data from an RFID reader, which may be associated with the point-of-sale computing system or otherwise nearby a location at which the user may use the payment card, for example. The processor may decrypt the encrypted data and provide the decrypted data on the display. Furthermore, in some such embodiments, the display and/or other components of the payment card (e.g., the RFID tag, the processor) may be powered via an energy harvesting circuit that harvests energy from the radio-frequency waves received at the RFID tag from the RFID reader. The energy harvesting circuit may include or be coupled to a capacitor or other energy storage component that stores and makes the harvested energy available to the display and/or the other components of the payment card. However, in addition to or as an alternative to the energy harvesting circuit and associated components, other sources of power are also envisioned (e.g., rechargeable batteries, which may be charged wirelessly or via a wired connection; replaceable batteries).

With the foregoing in mind, FIG. 1 is a block diagram of a payment card system 10 that includes a payment card 12 (e.g., physical payment card having a card body). The payment card 12 may be a flat card (e.g., having a flat card body) that includes a front surface and a back surface. The payment card 12 may have standard dimensions, and thus, may be approximately 5.4 centimeters (cm) long, approximately 8.5 cm wide, and approximately 0.08 cm thick (e.g., between the front surface and the back surface). However, the payment card 12 may have other similar dimensions, such as approximately 5 to 6 cm long, approximately 8 to 9 cm wide, and approximately 0.05 to 0.1 cm thick, or such as approximately 4 to 7 cm long, approximately 6 to 10 cm wide, and approximately 0.05 to 0.5 cm thick. The payment card 12 may be sized so that the user can carry the payment card 12 in a wallet and/or easily grip and handle the payment card 12 with one hand. Further, the payment card 12 may be sized to slide into traditional card readers (e.g., magnetic strip readers and chip readers). In some embodiments, a particular portion of the card (e.g., a side with the magnetic strip or the side with the chip; proximate to a first edge) may be slightly thinner than a portion with a display 14 (e.g., proximate to a second edge that is opposite the first edge), for example.

As shown, the payment card 12 may include the display 14 (e.g., electronic display; low-power electronic display, such as an electronic ink display) and a card computing system 16. The card computing system 16 may include various processing and communication components, such as a processor 18, a memory 20, a storage 22, and a communicator or communication device 24. The communication device 24 enables the card computing system 16 to communicate over one or more networks, such as a network 26 (e.g., wireless network, such as the Internet) and/or over a network 28 (e.g., wireless network, such as a Bluetooth network).

The card computing system 16 may be configured to receive account information and to cause display of the account information on the display 14. The account information may include, but is not limited to, an amount of available credit, a date and/or an amount of the most recent transaction(s), a date and/or an amount of a payment due, and/or a map indicating a location of the most recent transaction(s). The card computing system 16 may receive the account information in any of a variety of ways. For example, the card computing system 16 may receive the account information from an account computing system 30 via the network 26. As shown, the account computing system 30 may include various processing and communication components, such as a processor 32, a memory 34, a storage 36, and a communicator or communication device 38 that enables the account computing system 30 to communicate over the network 26.

Additionally, the account computing system 30 may be associated with or in communication with a card network 40 (e.g., payment network or card issuer, such as VISA, MASTERCARD, and/or a bank). Thus, the account computing system 30 may have access to and/or may store the account information (e.g., up-to-date account information, which may be based on transactions processed over and approved by the card network 40, payment due dates, and/or credit limits). The account computing system 30 may communicate the account information to the card computing system 16 while the card computing system 16 is in communication with the network 26 (e.g., the user carrying the payment card 12 is within range of a network wireless router that is connected to the network 26). For example, the account computing system 30 may automatically communicate the account information to the card computing system 16 in response to the card computing system 16 joining the network 26. In this way, the display 14 of the payment card 12 may display the account information to the user, and the account information on the display 14 of the payment card 12 may be updated over time.

In operation, the user may enter a store (e.g., a physical, brick-and-mortar store), and may interact with a point-of-sale computing system 50 to carry out a transaction. For example, the user may swipe the payment card 12 at a card reader 52, which is configured to read information (e.g., card information or data; unique to the payment card 12) encoded in a magnetic stripe, chip, barcode, or other feature or encoder (e.g., other physical feature or encoder printed, etched, or positioned on or in the flat body of the payment card; other physical feature or encoder with its only purpose or functionality being to encode the information and to enable reading of the information via the point-of-sale computing system 50; configured to enable reading of the information via contact and/or swiping at the point-of-sale computing system 50) of the payment card 12. In the present disclosure, these physical features or encoders (e.g., magnetic strips, chips, barcode, printed features, etchings) that encode information are referred to as physical encoders, which are physically integrated with (e.g., disposed on, formed in, attached to) the payment card 12 (e.g., the card body). The card reader 52 may include or be communicatively coupled to a processor 54, a memory 56, a storage 58, and a communication device 60 that enables the point-of-sale computing system to communicate over the network 26 and/or over the network 28. In some embodiments, the card reader 52 is a physically separate device that is communicatively coupled (e.g., via a wired or wireless network, such as the network 26 or the network 28) to a merchant device (e.g., mobile phone, tablet, laptop computer, desktop computer) having the processor 54, the memory 56, the storage 58, and the communication device 60. After the user swipes the payment card 12 at the card reader 52, the point-of-sale computing system 50 may send a request for payment to the card network 40 via the network 26. The card network 40 may communicate approval of the request for payment to the point-of-sale computing system 50 via the network 26, and the transaction may then be completed.

In such cases, the card network 40 may also communicate the approval of the request for payment to the account computing system 30. In this way, the account computing system 30 may maintain the up-to-date account information. For example, the accounting computing system 30 may determine the available credit (e.g., by subtracting the amount of the transaction from an available credit line). It should be appreciated that the account computing system 30 may obtain some or all of the account information and/or data (e.g., the approval of the request for payment) that is used by the account computing system 30 to determine the account information from any other suitable source.

The disclosed embodiments may also account for online transactions (e.g., not at a physical, brick-and-mortar store). For example, upon completion of a transaction with the payment card 12 via an online checkout system accessed by a web browser or other application and/or upon completion of an automatic, scheduled payment charged to the account associated with the payment card 12, the account computing system 30 may update the account information. Similarly, upon completion of a transaction with another payment card of an authorized user that is linked to the account associated with the payment card 12, the account computing system 30 may update the account information. In this way, the account computing system 30 may have the up-to-date account information and may be able to communicate the up-to-date account information to the card computing system 16 of the payment card 12 for display via the display 14 of the payment card 12 while the card computing system 16 of the payment card 12 is in communication with the network 26. The card computing system 16 of the payment card 12 may store the account information (e.g., in the storage 22) so that the account information can be displayed via the display 14 even while the card computing system 16 is not in communication with the network 26. However, in such cases, the account information that is displayed may not be up-to-date if transactions have occurred after the time when the account computing system 30 provided the account information to the card computing system 16. To assist the user in determining whether the account information shown on the display 14 is likely up-to-date, the card computing system 16 may cause display of a time (e.g., time of day and/or date) at which the card computing system 16 last received the account information from the account computing system 30.

It should be appreciated that the account computing system 30 may communicate the account information to the card computing system 16 of the payment card 12 continuously, periodically, and/or in response to an event while the card computing system 16 is in communication with the network 26. The event may be the payment card 12 joining the network 26, the payment card 12 entering a store or other location where the user is likely to use the payment card 12 (e.g., detected via a Wi-Fi positioning system or other wireless access point geolocation system), the payment card 12 being swiped at the card reader 52, completion of a transaction using the payment card 12, completion of a transaction for the account associated with the payment card 12, a request input via a user device 70 of the user (e.g., a mobile device, a tablet, a laptop computer, a desktop computer), and/or a request input via an input device 72 on the payment card 12, for example. In some embodiments, the user may interact with the input device 72 (e.g., press or tap) on the input device 72 to cause the display 14 to display the account information.

In some embodiments, the account information may additionally or alternatively be provided to the card computing system 16 by the point-of-sale computing system 50 and/or by the user device 70. In certain circumstances, the card computing system 16 may not be able to communicate with the account computing system 30 (e.g., may not have access to the network 26), but the card computing system 16 may be in close enough proximity to the point-of-sale computing system 50 and/or by the user device 70 to establish communication via a short-range wireless network or personal area network, such as the network 28. In such cases, the point-of-sale computing system 50 may have a wireless or wired connection to the network 26 that enables the point-of-sale computing system 50 to communicate with the account computing system 30 to obtain the account information from the account computing system 30. The point-of-sale computing system 50 may then provide the account information to the card computing system 16 via the network 28. Similarly, the user device 70 may have a wireless or wired connection to the network 26 that enables the user device 70 to communicate with the account computing system 30 to obtain the account information from the account computing system 30. The user device 70 may then provide the account information to the card computing system 16 via the network 28. In some embodiments, it may be advantageous for the payment card 12 to be devoid of components that enable connection to network wireless routers and communication via the Internet (e.g., the network 26), and to instead only have components that enable communication via wireless personal area network technology or other similar lower-power communication technology (e.g., the network 28; short-range data transfer).

In these cases, it should be appreciated that the account computing system 30 may communicate the account information to the point-of-sale computing system 50 and/or the user device 70 continuously, periodically, and/or in response to an event while the point-of-sale computing system 50 and/or the user device 70 is in communication with the network 26. Additionally or alternatively, the account computing system 30 may communicate the account information to the point-of-sale computing system 50 and/or the user device 70 continuously, periodically, and/or in response to an event while the card computing system 16 is in communication with the point-of-sale computing system 50 and/or the user device 70 via the network 28. Additionally or alternatively, the point-of-sale computing system 50 and/or the user device 70 may communicate the account information continuously, periodically, and/or in response to an event while the card computing system 16 is in communication with the point-of-sale computing system 50 and/or the user device 70 via the network 28.

The event may be the payment card 12 joining the network 28, the payment card 12 entering a store or other location where the user is likely to use the payment card 12 (e.g., detected via a Wi-Fi positioning system or other wireless access point geolocation system), the payment card 12 being swiped at the card reader 52, completion of a transaction using the payment card 12, completion of a transaction for the account associated with the payment card 12, a request input via the user device 70 of the user, and/or a request input via the input device 72 on the payment card 12. For example, in response to the card computing system 16 of the payment card 12 connecting with the point-of-sale computing system 50 via the network 28 as the user approaches the check-out area, the point-of-sale computing system 50 may access the account information from the account computing system 30 via the network 26 and then provide the account information to the card computing system 16 for display on the display 14 of the payment card 12 via the network 28. As another example, in response to the user entering a store, the user device 70 may access the account information from the account computing system 30 via the network 26 and then provide the account information to the card computing system 16 for display on the display 14 of the payment card 12 via the network 28.

In some embodiments, the user device 70 may not have access to the account computing system 30 (e.g., may be offline). In some embodiments, the user device 70 may not be able to efficiently access and/or display the account information from the account computing system 30. In these cases, the user device 70 may be able to obtain the account information from the card computing system 16 when brought into proximity of the payment card 12. For example, the payment card 12 may obtain and/or store the account information using any of the techniques disclosed herein, and then the user may hold the user device 70 near the payment card 12 to establish communication between the user device 70 and the payment card 12 via the network 28. Upon connection of the user device 70 and the payment card 12 via the network 28, the card computing system 16 may automatically communicate the account information to the user device 70. Additionally, the user device 70 may include an application that opens (e.g., automatically opens upon receipt of the account information from the payment card 12) and/or provides a pop-up notification of the account information (and in some cases additional information that cannot be shown on the display 14) on a display 74 of the user device 70. In this way, the user may be efficiently notified or alerted with time sensitive information (e.g., the amount of available credit) on the payment card itself and/or via the user device 70 even when the user device 70 is offline. In some embodiments, the payment card 12 may provide an alert (e.g., a non-visual alert, such as an audible alarm or vibration and/or a visual alert, such as a symbol or illuminated light source; in some cases, the payment card 12 may not include the display 14) indicative of receipt of the account information at the payment card 12, which is intended to notify and to prompt the user to connect the user device 70 to the payment card 12 to enable visualization of the account information and/or the additional information on the user device 70.

In some embodiments, the user device 70 may be used to hover over the payment card 12 to enable the user device 70 to obtain information about the payment card 12, such as the payment card number. The user device 70 may obtain the information via the network 28 and/or via imaging technologies, such as by using a camera to take a photo of the payment card 12 and using imaging processing techniques to determine the information. Once the user device 70 obtains the information, the user device 70 may then communicate with the account computing system 30 or other system via the network 26 to obtain more detailed account information (e.g., the available credit line). The user device 70 may then display the account information on the display 74 of the user device 70. In this way, the user may efficiently view account information for the account associated with the payment card 12 by holding the user device 70 near the payment card 12.

It should be appreciated that the payment card 12 may include other features to enable the disclosed techniques. For example, the payment card 12 may include a power source 76, such as a rechargeable or replaceable battery or capacitor. The power source 76 may be configured to provide power to the processing and communication components, as well as to the display 14. The payment card 12 may also include a power source 78, which may be actuated by the user to turn on and off power to the component of the payment card 12. Additionally or alternatively, the power source may be actuated via motion (e.g., detected by a motion sensor 73 in the payment card 12), such that the power is turned on for a period of time after detection of motion or a sudden change in motion (e.g., the user pulls the payment card 12 out of a wallet; a certain type of motion that corresponds to a signature motion stored in the storage 22, such as pulling the payment card 12 out of the wallet; a sudden change in a pattern of motion, such as going from walking with the payment card 12 in a pocket to pulling the payment card 12 from the pocket, and/or generally exceeds a motion threshold stored in the storage 22, such as an acceleration threshold due to a sudden change) and/or the power is turned off for a period of time after the absence of motion (e.g., the user sets the payment card 12 on the counter overnight) as part of a power-saving protocol.

Using the disclosed payment card system 10, the user may efficiently view account information for the account associated with the payment card 12. In some cases, the user may efficiently view the account information simply by walking into an area with wireless Internet service, by walking into a store, by approaching the point-of-sale computing system 50, by swiping the payment card 12 at the card reader 52, and/or by holding the user device 70 near the payment card, for example. Thus, the user may be made aware of the account information, including what they are able to spend without exceeding an amount or while maintaining enough funds to pay future bills, for example.

It should be appreciated that the payment card 12 may be configured to provide the account information, including the available credit, in any of a variety of formats. For example, the payment card 12 may provide words, numbers, icons, or any combination thereof on the display 14. For example, as shown in FIG. 1, the payment card 12 may display the text "AVAILABLE CREDIT" followed by a dollar amount. However, to reduce power used by the payment card 12 and/or the size of the display 14, the payment card 12 may only display a dollar amount. In some embodiments, the payment card 12 may only display an icon representative of ranges of available credit (e.g., as percentages or dollar amounts), such as a first icon if greater than 75 percent of the total credit line is available, a second icon if between 50 to 75 percent of the total credit line is available, a third icon if between 25-50 percent of the total credit line is available, and a fourth icon if less than 25 percent of the total credit line is available. Separate icons may be used for different dollar amounts of available credit, such as a first icon if greater than $1,000 of credit is available and a second icon if less than $1,000 of credit is available. The display of icons may reduce the power used by the payment card 12 to convey the account information to the user, as compared to frequent changes (e.g., constantly updated numerical data) and/or the display of lengthy text messages or other indicators.

As noted above, the payment card may be designed to have minimal processing capabilities and/or power usage. Thus, the payment card 12 may additionally or alternatively include a radio-frequency identification (RFID) tag 75 that receives encrypted data indicative of the account information (e.g., that provides the account information when decrypted). The RFID tag 75 may receive the encrypted data from a RFID reader 77, which may be associated with the point-of-sale computing system 50 or otherwise nearby a location at which the user may use the payment card. For example, the RFID reader 77 may be positioned at an entrance to a store. It should be appreciated that the RFID reader 77 may receive the account information via communication with the account computing system 30.

The processor 18 may decrypt the encrypted data and provide the decrypted data on the display 14. Furthermore, in some such embodiments, the display 14 and/or other components of the payment card 12 (e.g., the RFID tag 75, the processor 18) may be powered via an energy harvesting circuit 79 that harvests energy from the radio-frequency waves received at the RFID tag 75 from the RFID reader 77. In some embodiments, the energy harvesting circuit 79 may include or be coupled to the power source 78, which stores and makes the harvested energy available to the display 14 and/or the other components of the payment card 12. Thus, in operation, the account information may be automatically displayed on the payment card 12 as the user enters into a range of the RFID reader 77 (e.g., the RFID communication provides the account information and sufficient power to temporarily display the account information on the display 14 of the payment card 12). In the example above, the account information would be automatically displayed on the payment card 12 as the user enters the store as the user passes by the RFID reader 77. Importantly, in at least some of the disclosed embodiments, the account information may be displayed on the display 14 of the payment card 12 without swiping the payment card 12, without reading a magnetic stripe of the payment card 12, and/or without scanning a barcode or other markings visible or printed on the payment card 12. Indeed, the account information may be displayed on the display 14 of the payment card 12 even while the payment card 12 remains in the wallet, pocket, or bag of the user. In some such cases, the account information may then be displayed upon the detection of the motion of the payment card by the motion sensor 73 to reduce the power consumed by the payment card 12. In some embodiments, the RFID tag 75 and/or the various processing and communication components disclosed herein (e.g., the processor 18, the communication device 24) may be utilized instead of the magnetic strip or other physical feature or encoder of the payment card 12 to facilitate the transaction with the point-of-sale computing system 50. However, providing for the communication of the account information (e.g., via the RFID tag 75 and/or the various processing and communication components disclosed herein) separately from the communication of the card data (e.g., via the magnetic strip or other physical feature or encoder of the payment card 12) that is used to complete the transaction with the merchant may enable the display of the account information more efficiently and/or the completion of the transaction more efficiently. It should be appreciated that the payment card 12, and the payment card system 10 as a whole, may include more or fewer components than shown in FIG. 1.

Furthermore, the user may establish user-preferred settings for the payment card 12, such as preferences related to when to display the payment due date or other account information (e.g., display schedule) on the payment card, when to transmit the account information (e.g., transmission schedule) to the payment card 12, to display the last purchase only when the last purchase was made using another payment card held by an authorized user or only when the last purchase was made online (e.g., display data), or the like. The preferences 16 may be stored at the card computing system 16 and/or at the account computing system 30, and the card computing system 30 and/or the account computing system 30 may be configured to filter the account information based on the preferences. For example, the account information may be compared to and/or filtered based on the preferences, such that output of the account information content provided via the display 14, the transmission schedule of the account information to the payment card 12, and/or the display schedule for the account information on the display 14 of the payment card 12 corresponds to the preferences.

Figure 2:
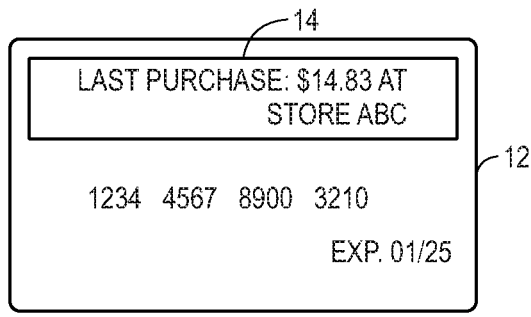
FIG. 2 illustrates a first example of other account information that may be displayed on the display of the payment card of the payment card system of FIG. 1, in accordance with embodiments described herein.
Figure 3:
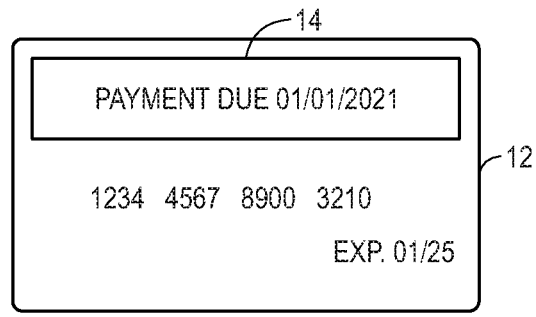
FIG. 3 illustrates a second example of other account information that may be displayed on the display of the payment card of the payment card system of FIG. 1, in accordance with embodiments described herein.

As noted above, the account information may include any of a variety of types of information related to the account associated with the payment card 12. Accordingly, FIGS. 2-5 illustrate various types of account information on the display 14 of the payment card 12. For example, as shown in FIG. 2, the payment card 12 may display a dollar amount and/or a location of the last transaction(s) (e.g., store name). Additionally or alternatively, the payment card 12 may display a date of the last transaction(s). As shown in FIG. 3, the payment card 12 may display a payment due date. In some embodiments, the payment due date may be displayed only as the payment due date approaches, such as the day before the payment due date or any other suitable time threshold. In this way, the payment card system 10 may remind the user of the payment due date at a time when the user should take action to make a payment toward the account associated with the payment card 12. For example, the payment card 12 may ordinarily default to displaying other types of account information, such as the available credit, but the payment card 12 may default to displaying the payment due date as the payment due date approaches (e.g., the default may be the first information displayed upon receipt of the account information at the card computing system 16 and/or upon powering on the payment card 12).

Figure 4:
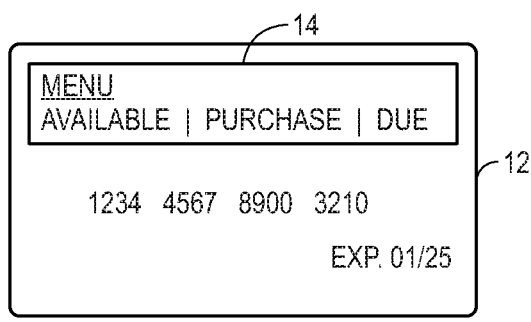
FIG. 4 illustrates a third example of other account information that may be displayed on the display of the payment card of the payment card system of FIG. 1, in accordance with embodiments described herein.

As shown in FIG. 4, the payment card 12 may display a menu that the user can interact with by touching the display 14 (e.g., touchscreen display) and/or the input device 72. In some embodiments, the user may establish user-preferred settings for the payment card 12. For example, the user may select a preferred, default display setting using the input device 72 and/or the user device 70. In such cases, the user may use the user device 70 to set the preferred, default display setting so that the dollar amount and/or the location of the last transaction is always the first information displayed on the display 14 of the payment card 12. The user may also set other preferences, such as preferences related to when to display the payment due date or other account information (e.g., display schedule) on the payment card, when to transmit the account information (e.g., transmission schedule) to the payment card 12, to display the last purchase only when the last purchase was made using another payment card held by an authorized user or only when the last purchase was made online (e.g., display data), or the like.

Figure 5:
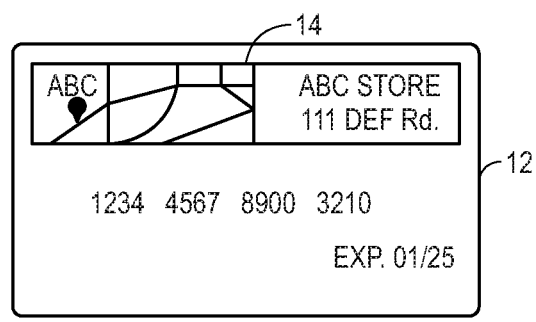
FIG. 5 illustrates a fourth example of other account information that may be displayed on the display of the payment card of the payment card system of FIG. 1.

As shown in FIG. 5, the payment card 12 may display a map that illustrates a location of the last transaction(s). In some embodiments, the map may be provided in combination with other related account information, such as the dollar amount, the store name, and/or the date of the last transaction(s). The account computing system 30 may track the respective locations of the transactions made using the payment card 12 and/or other payment cards held by authorized users (e.g., transactions for the account associated with the payment card 12), such as by receiving location data via the point-of-sale computing system 50 upon completion of the transactions and/or correlating transactions for the account with location data for the payment card 12 (e.g., detected via the Wi-Fi positioning system or other wireless access point geolocation system) based on time (e.g., occurring close in time). The map may assist users in cases in identifying where they last used the payment card 12 and/or provide additional context to the last transaction(s).

It should be appreciated that the payment card 12 may include other features, such as a speaker or haptics 78 (FIG. 1), that enable the payment card 12 to provide an indication to the user that the account information was received at the payment card 12 and/or displayed via the display 14. In some embodiments, the speaker or haptics 78 may additionally or alternatively provide the indication at other times, such as when the available credit is low (e.g., less than 25 percent of the total available credit or below a target amount set by the user) and/or when another payments card of an authorized user has been used for a transaction. The indication may be a beep, a vibration pattern, or the like. In some embodiments, the payment card 12 may use the speaker or haptics 78 to provide a first non-visual alert indicative of receipt of the account information while the display 14 remains powered off, and then the payment card 12 may power on and use the display 14 to provide the visual alert of the account information after some delay time following the first non-visual alert and/or after detection of motion of the payment card 12 as part of a power-saving protocol. Furthermore, the display 14 may be configured to display words, numbers, and/or icons with various characteristics, such as flashing or different colors, to convey information to the user. For example, the available credit may be presented with flashing and/or a red color when the available credit is low (e.g., less than 25 percent of the total available credit or below a target amount set by the user), and the available credit may be presented in a green color when the available credit is high (e.g., greater than 75 percent of the total available credit or above the target amount set by the user). In this way, the payment card 12 may display the account information in a way that encourages the user to not proceed with a purchase, to proceed with a purchase, or to otherwise alter spending habits.

The processors 18, 32, 54 disclosed herein may be any type of suitable processing circuitry, microprocessor, or computer processor capable of executing computer-executable code. The processors 18, 32, 54 may also include multiple processors that may perform the operations described herein. The memories 20, 34, 56 and the storage 22, 36, 58 may be any suitable articles of manufacture that can serve as media to store processor-executable code, data, or the like. These articles of manufacture may represent non-transitory, computer-readable media (e.g., any suitable form of memory or storage) that may store the processor-executable code used by the respective processors 18, 32, 54 to perform the presently disclosed techniques. The memories 20, 34, 56 and the storage 22, 36, 58 may also be used to store data, various other software applications, and the like. It should be noted that non-transitory merely indicates that the media is tangible and not a signal. It should be noted that the components described above with regard to the payment card system 10 are exemplary components and the payment card system 10 may include additional or fewer components as shown.

Figure 6:
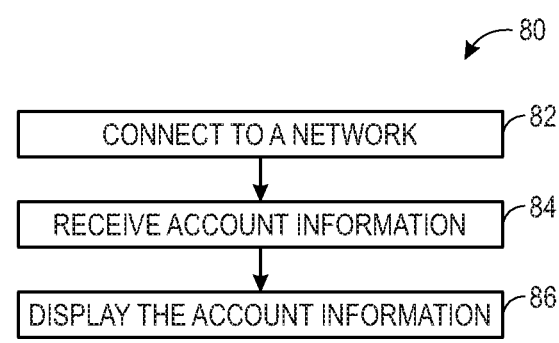
FIG. 6 illustrates a flow chart of a method for displaying account information on the display of the payment card of the payment card system of FIG. 1, in accordance with embodiments described herein.

With the foregoing in mind, FIG. 6 illustrates a flow chart of a method 80 for displaying account information on the display 14 of the payment card 12, in accordance with embodiments described herein. Although the following description of the method 80 is described in a particular order, which represents a particular embodiment, it should be noted that the method 80 may be performed in any suitable order. Moreover, although the following description of the method 80 is described as being performed by the card computing system 16 of the payment card 12, it should be noted that some or all of the steps of the method 100 may be performed by any suitable computing device.

Referring now to FIG. 6, at block 82, the card computing system 16 of the payment card 12 may connect to a network, such as the network 26 or the network 28. For example, the card computing system 16 may connect to the network 26 and may communicate with the account computing system 30 over the network 26. In some embodiments, the card computing system 16 may connect to the network 28 and may communicate with the point-of-sale computing system 50 and/or the user device 70 over the network 28. The card computing system 16 may connect to the network 26 upon entering a respective range of the network 26 (e.g., walking within a respective range of a router) or may connect to the network 28 upon entering a respective range of the network 28 (e.g., walking within a respective range of the point-of-sale computing system 50 in a store).

In block 84, the card computing system 16 may receive account information over the network, such as from the account computing system 30 over the network 26. In some embodiments, the card computing system 16 may receive the account information from the point-of-sale computing system 50 and/or the user device 70 over the network 28. As discussed above, the card computing system 16 may receive the account information continuously, periodically, and/or in response to an event (e.g., joining the network 26 or the network 28; entering a store; the payment card 12 being swiped at a card reader of the point-of-sale computing system 50, completion of a transaction using the payment card 12, completion of a transaction for the account associated with the payment card 12, a request by the user) while the card computing system 16 is in communication with the network 26 or the network 28.

In block 86, the card computing system 16 may cause the display 14 to display the account information for visualization by the user. In some embodiments, the card computing system 16 may cause the display 14 to display the account information in response to receipt of the account information (e.g., receipt of the account information may activate the display 14). In this way, the user may efficiently view account information for the account associated with the payment card 12 on the payment card 12 itself. Additionally or alternatively, the card computing system 16 may store the account information locally (e.g., in the storage 22) and may cause the display 14 to display the account information for visualization by the user at another time. For example, the card computing system 16 may store the account information and may initiate display of the account information after some time delay period following receipt of the account information, such as in response to detection of motion of the payment card 12 via the motion sensor 73 that may occur after some time delay period following receipt of the account information. As another example, the card computing system 16 may store the account information locally and may cause the display 14 to display the account information even while the card computing system 16 is not in communication with the network 26, the network 28, or other external source of the account information. Thus, the disclosed embodiments may make the user aware of the account information, including what they are able to spend without exceeding an amount or while maintaining enough funds to pay future bills, for example.

As discussed herein, the payment card 12 may include the RFID tag 75 and associated components that operate to cause the display 14 to display the account information for visualization by the user in response to receipt of data from the RFID reader 77. The payment card 12 may also harvest power via the communication with the RFID reader 77. The RFID tag 75, the RFID reader 77, and the various communication devices 24, 38, and 60 may be referred to as transceivers, which as used herein means configured to receive and/or to transmit signals.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A payment card, comprising:
a physical encoder integrated into a card body of the payment card, wherein the physical encoder encodes data unique to the payment card and enables a point-of-sale system to read the data unique to the payment card to facilitate a transaction;
an electronic display integrated into the card body;
a motion sensor integrated into the card body; and
a card computing system integrated into the card body and comprising one or more processors configured to:
receive account information related to an account associated with the data unique to the payment card;
process sensor data from the motion sensor to determine motion of the payment card; and
in response to determining the motion of the payment card, instruct the electronic display to display the account information for visualization by a user of the payment card.

2. The payment card of claim 1, wherein the physical encoder comprises a magnetic strip readable by the point-of-sale system.

3. The payment card of claim 1, wherein the account information comprises an available amount of credit in the account associated with the payment card.

4. The payment card of claim 1, wherein the account information comprises a date, an amount, a location, or any combination thereof of a most recent transaction for the account associated with the payment card.

5. The payment card of claim 4, wherein the account information comprises a map indicating the location of the most recent transaction for the account associated with the payment card.

6. The payment card of claim 1, wherein the account information comprises a payment due date for the account associated with the payment card.

7. The payment card of claim 1, comprising a power source integrated into the card body and configured to provide power to the electronic display, wherein the power source is configured to turn on for a period of time in response to determining the motion of the payment card exceeds a motion threshold and to turn off in response to determining an absence of the motion.

8. The payment card of claim 1, comprising a communication device integrated into the card body and configured to establish communication with a network, wherein the one or more processors are configured to receive the account information via the communication device and the network.

9. The payment card of claim 1, comprising a radiofrequency identification (RFID) tag integrated into the card body, wherein the RFID tag is configured to receive the account information via communication with a RFID reader that is communicatively coupled to an account computing system that stores the account information.

10. The payment card of claim 1, wherein the one or more processors are configured to:
 compare the motion to a signature motion stored in a storage device of the payment card; and
 in response to the motion corresponding to the signature motion, instruct the electronic display to display the account information for visualization by the user of the payment card.

11. The payment card of claim 1, comprising a haptic device integrated into the card body and configured to provide a haptic output.

12. The payment card of claim 1, comprising an RFID tag configured to receive one or more radio-frequency waves.

13. The payment card of claim 12, comprising a power harvesting circuit configured to harvest power from the one or more radio-frequency waves received at the RFID tag and provide the power to the electronic display.

14. The payment card of claim 13, wherein the power harvesting circuit is coupled to an energy storage component configured to store the harvested power and provide the power to the physical encoder, the electronic display, the motion sensor, the card computing system, or any combination thereof.

15. The payment card of claim 1, wherein the one or more processors are configured to receive one or more user preferences comprising a display schedule, a transmission schedule, or both.

16. The payment card of claim 15, wherein the one or more processors are configured to:
 filter the account information based on the one or more user preferences to generate filtered account information; and
 instruct display of the filtered account information.

17. The payment card of claim 1, comprising a power source configured to provide power to the electronic display and the card computing system, wherein the power source comprises a rechargeable or a replaceable battery.

18. The payment card of claim 1, wherein the one or more processors are configured to receive the account information in response to an event, the user entering a store, the payment card being swiped at a card reader of the point-of-sale system, completion of the transaction, or any combination thereof.

19. The payment card of claim 1, wherein the one or more processors are configured to provide an indication in response to receipt of the account information, wherein the indication comprises a visual alert, a non-visual alert, or both.

20. The payment card of claim 1, wherein the one or more processors are configured to provide a non-visual alert at a first time in response to receipt of the account information while the electronic display is powered off and to display the account information as a visual alert at a second time in response to determining the motion of the payment card while the electronic display is powered on.

* * * * *